May 18, 1954
H. S. ORR
2,678,568
APPARATUS FOR AUTOMATICALLY CENTERING
ENDLESS SINGLE WEAVE METALLIC BELTS
Filed March 20, 1951
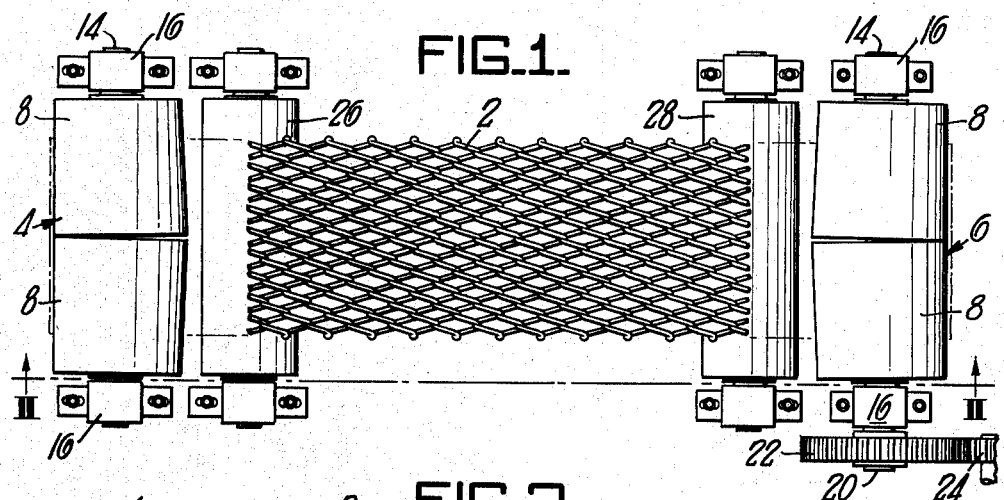
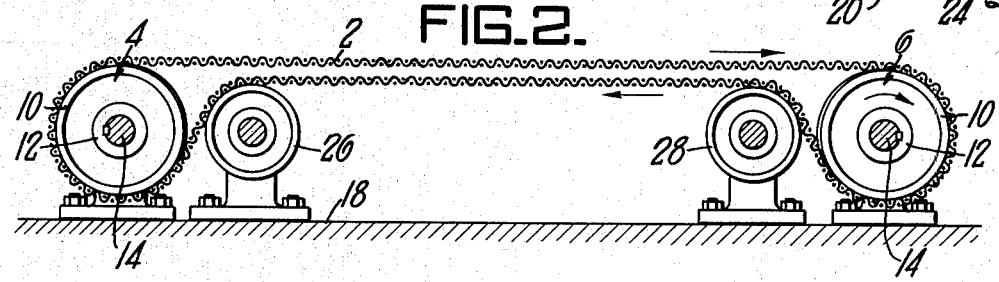
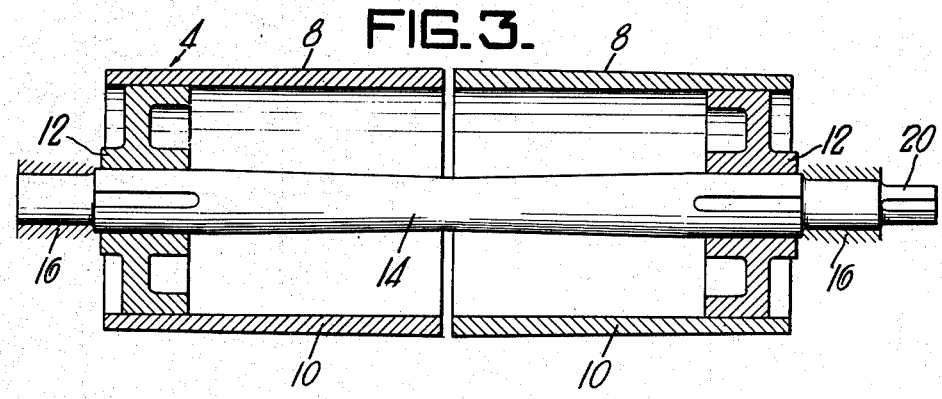
*Inventor:*
HOWARD S. ORR,
by: Donald G. Dalton
*his Attorney.*

UNITED STATES PATENT OFFICE 2,678,568

APPARATUS FOR AUTOMATICALLY CENTERING ENDLESS SINGLE WEAVE METALLIC BELTS

Howard S. Orr, Pittsburgh, Pa., assignor to United States Steel Corporation, a corporation of New Jersey Application March 20, 1951, Serial No. 216,633

5 Claims. (Cl. 74—241)

This invention relates to apparatus for automatically centering an endless single weave metallic belt. Single weave or one-way spirally woven wire belting is so named because the spiral twists or loops in the mesh all incline in the same angular direction. The spiral twists or loops when woven together, thus form surface ribs diagonally in one direction across the belt. Such a belt is shown in Harter Patent No. 2,151,913. This type of spirally woven belt is cheaper to manufacture than the various types of right and left hand weave wire woven belts which require two operations on the weaving machines and considerable handwork in assembling the right and left hand sections into an endless belt. Various types of the right and left hand wire woven belts are shown in the patents to Swinscoe No. 712,212, Pink No. 1,845,935 and Pink No. 1,947,357. Because of the cheaper cost, it is desirable to utilize single weave spirally woven belts but because of its construction it is extremely difficult to keep the belt on the pulleys or rolls over which it passes. Insofar as I am aware, the only successful way of keeping the belt centered is to provide a relatively heavy type of sprocket chain at each edge of the belt and to provide sprockets on the pulley shafts to engage the chains. This extra apparatus is expensive and not entirely satisfactory as it is very difficult to equalize the wear on both the wire belt and sprocket chain. I have also tried to utilize automatic centering rolls such as shown in the copending applications to Edwin T. Lorig, Serial No. 97,218, filed June 4, 1949, now Patent No. 2,593,157; Serial No. 138,389, filed January 13, 1950, now Patent No. 2,593,581; and Serial No. 145,648, filed February 23, 1950, now Patent No. 2,593,158. However, the diagonal planar action of the single weave wire belt is so great that it overcomes the centering action of these rolls.

It is an object of my invention to provide apparatus which will automatically center a moving endless single weave metallic belt.

This and other objects will be more apparent after referring to the following specification and attached drawings, in which:

Figure 1 is a top plan view of my device with part of the belt omitted;

Figure 2 is a view taken on the line II—II of Figure 1; and

Figure 3 is a sectional view taken through an automatic centering roll.

Referring more particularly to the drawings, the reference numeral 2 indicates an endless single weave metallic belt which passes around the spaced apart automatic centering rolls 4 and 6. As shown, each of the automatic centering rolls are of the type disclosed in the copending patent to Edwin T. Lorig, No. 2,593,158. However, these automatic centering rolls may also be of the type disclosed in either of the other above identified copending patents. Each of the automatic centering rolls 4 and 6 is made up of a pair of opposed frusto conical rolls 8 which are arranged with their large diameter ends adjacent each other. In actual practice the inner ends of the rolls 8 need only be three to ten thousandths of an inch larger in diameter than the outer end of the roll. Each of the rolls 8 consists of a rim portion 10 fastened to a hub portion 12 which is keyed to a rotatable shaft 14. The shaft 14 is mounted in bearings 16. The bearings 16, for at least one of the pulleys, are mounted for adjustment on a bed plate 18 in order to permit alignment of the axes of the pulleys 4 and 6. One of the shafts 14 extends beyond the bearing 16 in order to provide means for driving the roll. Due to the inherent flexibility of the webs and rims the rims will deflect under load and their axes of rotation will change so that they diverge away from the direction of approach of the belt. This creates a force on the belt having a component directed toward the transverse center of the roll as more fully described in Lorig Patent No. 2,593,158. For example, a shaft extension 20 may have a gear 22 mounted thereon which is driven by a pinion 24. A substantially cylindrical pulley 26 is provided adjacent the roll 4 on the side thereof toward the roll 6. A similar cylindrical pulley 28 is arranged in like manner adjacent the roll 6. The belt passes down around the roll 6 over a considerable arc thereof and up around the idler pulley 28. After passing over a considerable arc of the pulley 28 the belt passes to the pulley 26 and around a considerable arc thereof to the roll 4. After passing around a considerable arc of the roll 4 the belt passes back to the roll 6. It will be noted that the axes of the pulleys 26 and 28 are in substantially the same plane as the axes of the rolls 4 and 6 and that one side of the belt 2 contacts the rolls 4 and 6 while the other side of the belt contacts the pulleys 26 and 28. As the belt passes around the rolls and pulleys a diagonal force tending to move the belt across the face of the rolls is created due to the single weave construction of the belt. The direction of this force depends upon whether the belt has a right or left hand weave. This arrangement neutralizes the diagonal planar action of the belt immediately and the automatic centering rolls 4 and 6 act to keep the belt centered on the rolls and pulleys. The direction of the diagonal action of the belt passing over a roll is always in respect to the contacting surface so that when opposite sides of a belt contact successive rolls, the forces created will be in opposite directions, thus resulting in one force partly or completely counteracting the other. For best tracking, the distance between the roll 4 and pulley 26, as well as the distance between the roll 6 and pulley 28 should be kept at a minimum. If desired a plain roll may be substituted for automatic centering roll 4 with the rolls rotating in the direction shown in Figure 2.

The arrangements described above may also be used in conjunction with a single weave belt having sprocket chains at each edge thereof. In such a combination the belt is centered by the rolls thus neutralizing the transverse thrust of the belt.

While several embodiments of my invention have been described, it will be apparent that other adaptations and modifications may be made without departing from the scope of the following claims.

I claim:

1. Automatic belt centering apparatus comprising a moving endless single weave metallic belt, a pair of spaced apart rotating automatic centering rolls around which the belt passes, and a substantially cylindrical pulley closely adjacent each of said rolls on the side thereof toward the other roll, said belt passing around a considerable arc of one of said rolls and then around a considerable arc of the adjacent pulley, said belt passing from the first pulley around a considerable arc of the second pulley and then around a considerable arc of the second roll, one side of said belt contacting said rolls and the other side contacting said pulleys, the arcs of contact of the belt on said pulleys being sufficiently great with relation to the arcs of contact of the belt on the rolls to counteract the major portion of the diagonal planar action of the belt on said rolls.

2. Automatic belt centering apparatus comprising a moving endless single weave metallic belt, a pair of spaced apart rotating automatic centering rolls around which the belt passes and a substantially cylindrical pulley closely adjacent each of said rolls on the side thereof toward the other roll, the axes of said pulleys being substantially in the same plane as the axes of said rolls, said belt passing around a considerable arc of one of said rolls and then around a considerable arc of the adjacent pulley, said belt passing from the first pulley around a considerable arc of the second pulley and then around a considerable arc of the second roll, one side of said belt contacting said rolls and the other side contacting said pulleys, the arcs of contact of the belt on said pulleys being sufficiently great with relation to the arcs of contact of the belt on the rolls to counteract the major portion of the diagonal planar action of the belt on said rolls.

3. Automatic belt centering apparatus comprising a moving endless single weave metallic belt, a pair of spaced apart rotating rolls around which the belt passes and a substantially cylindrical pulley closely adjacent each of said rolls on the side thereof toward the other roll, said belt passing around a considerable arc of the first of said rolls and then around a considerable arc of the adjacent pulley, said belt passing from the first pulley around a considerable arc of the second pulley and then around a considerable arc of the second roll, one side of said belt contacting said rolls and the other side contacting said pulleys, one of said rolls being an automatic centering roll, the arcs of contact of the belt on said pulleys being sufficiently great with relation to the arcs of contact of the belt on said rolls to counteract the major portion of the diagonal planar action of the belt on said rolls.

4. Automatic belt centering apparatus comprising a moving endless single weave metallic belt, a pair of spaced apart rotatable rolls around which the belt passes, and a substantially cylindrical pulley closely adjacent one of said rolls, at least one of said rolls being an automatic centering roll around a considerable arc of which the belt passes, one side of said belt passing around a considerable arc of each of said rolls and the other side of the belt passing around a considerable arc of said pulley, the total amount of contact of one side of the belt on the pulley being sufficiently great with relation to the total amount of contact of the other side of the belt on the rolls to counteract the major portion of the diagonal planar action of the belt on said rolls.

5. Automatic belt centering apparatus comprising a moving endless single weave metallic belt, a pair of spaced apart rotatable rolls around which the belt passes and a substantially cylindrical pulley closely adjacent each of said rolls on the side thereof toward the other roll, said belt passing around a considerable arc of each of said rolls and pulleys, one side of said belt contacting said rolls and the other side contacting said pulleys, one of said rolls being an automatic centering roll, the arcs of contact of the belt on said pulleys being sufficiently great with relation to the arcs of contact of the belt on the rolls to counteract the major portion of the diagonal planar action of the belt on said rolls.

References Cited in the file of this patent

UNITED STATES PATENTS

| Number | Name | Date |
|---|---|---|
| 634,307 | Neidhardt | Oct. 3, 1899 |
| 677,333 | Bartholomew | July 2, 1901 |
| 1,056,223 | Sigafoos | Mar. 18, 1913 |
| 1,741,852 | Le Rud | Dec. 31, 1929 |
| 2,108,935 | Draper | Feb. 22, 1938 |
| 2,217,075 | O'Malley | Oct. 8, 1940 |